Patented Jan. 26, 1937

2,068,966

UNITED STATES PATENT OFFICE 2,068,966

METALLIC PAINT

Robert R. Thurston, Scarsdale, and Raymond J. Ruble, Beacon, N. Y., assignors to The Texas Company, New York, N. Y., a corporation of Delaware No Drawing. Application January 8, 1934, Serial No. 705,736

5 Claims. (Cl. 134—51)

This invention relates to the manufacture of metallic paint, such as aluminum paint, which may be readily formed and which after application will possess a hard, durable surface, not readily affected by the elements.

A satisfactory aluminum paint can be formed of from 12 to 18 parts of aluminum powder, 15 to 25 parts of an asphalt emulsion embodying from 60 to 70 parts solids, 15 to 60 parts of a solvent for bitumen, such as kerosene, naphtha, turpentine oil, amyl alcohol, etc., and up to 30 parts of water in addition to that contained in the asphalt emulsion. The materials are preferably combined by first making a paste of aluminum powder and a fluid carrier, such as the kerosene or naphtha referred to above. These materials should be combined in such proportion that a viscous paste is formed, a desirable proportioning being approximately 70% of aluminum powder and 30% kerosene.

The following is a typical example of the formation of a satisfactory aluminum paint:

The aluminum powder is first made into a paste by being mixed with a suitable fluid vehicle, such as kerosene. The ingredients are then mixed, preferably in some simple type of mechanical mixer which will afford continuous agitation, in the following order:

| | Percent by weight |
|---|---|
| Kerosene | 38 |
| Asphalt emulsion | 20 |
| Water containing 0.5% sodium oleate | 20 |
| Aluminum paste as above | 22 |

The first three ingredients are thoroughly mixed for the production of a homogeneous product which is essentially an emulsion of asphalt and kerosene in a water vehicle. The aluminum paste is then stirred in gradually while continuing the agitation and after the materials are thoroughly mixed they are ready for use.

It is preferred, however, to first make an emulsion of kerosene and water and then mix the asphalt emulsion and kerosene emulsion and thereafter add the metallic paste. This can be accomplished by first placing the water, containing a small amount of soap, such as sodium oleate, in the mixer, and first adding the kerosene with agitation until an emulsion is formed. The asphalt emulsion is then added and the emulsions are thoroughly mixed, after which the metallic paste is added with continued agitation.

A desirable asphalt emulsion should comprise from 60% to 70% solids, any commercial form of emulsion of normal fluidity being satisfactory for the purpose. The use of a small quantity of sodium oleate in the added water serves to effectively disperse the kerosene in the water phase of the emulsion and avoids any tendency to break the asphalt emulsion.

It is not necessary to introduce additional water, other than that contained in the emulsion, but through the use of the quantity of water stated, the kerosene or other solvent is emulsified so that the ingredients are more readily and thoroughly mixed during addition of the aluminum paste.

A satisfactory aluminum paint can be formed by combining 70% of aluminum with 30% of kerosene or other solvent for bitumen by weight, 9 parts of this aluminum paste mixture being incorporated with a mixture of 10 parts kerosene and 10 parts asphalt emulsion of approximately 60% solids concentration, no additional water being required.

The paint disclosed herein should be mixed immediately prior to its use, as is customary with metallic paints. The product can be readily brought to a homogeneous state where the aluminum powder, asphalt and kerosene are thoroughly mixed together. On application to a metal surface, for example, the emulsion breaks promptly leaving a coating of asphalt and aluminum powder. The presence of the kerosene increases the bond between the aluminum powder and asphalt and also causes the asphalt to adhere more closely to the applied surface. The kerosene gradually evaporates after a firm bond has been made between the coating materials and the coated surface, leaving a hard, tough surface of aluminum and asphalt on the coated surface, which does not tend to crack, check or draw and which has satisfactory weathering qualities.

It will be understood that the invention is applicable for the application of various metallic powders other than aluminum powder, for example, powdered bronze, powdered copper, and the like. In place of the kerosene other petroleum oil solvents or turpentine substitutes may be used.

Obviously, many modifications and variations of the invention, as hereinbefore set forth, may be made without departing from the spirit and scope thereof, and therefore only such limitations should be imposed as are indicated in the appended claims.

We claim:

1. A metallic paint consisting essentially of 12 to 18 parts of a metallic powder, 15 to 25 parts of asphalt emulsion embodying 60 to 70% solids, 15 to 60 parts of a solvent for bitumen and up to 30 parts of water.

2. An aluminum paint consisting essentially of 12 to 18 parts of powdered aluminum, 15 to 25 parts of asphalt emulsion embodying 60 to 70% solids, 15 to 60 parts of kerosene and up to 30 parts of water.

3. The process of forming a metallic paint comprising forming a viscous paste of powdered metal and a solvent for bitumen, forming an emulsion of 15 to 60 parts of kerosene and up to 30 parts of water with an emulsifying agent, combining said kerosene emulsion with an asphalt emulsion containing 50 to 70% solids and with said metallic paste.

4. The process of forming a metallic paint comprising forming a viscous paste of powdered metal and a solvent for bitumen, forming an emulsion of 15 to 60 parts of kerosene and up to 30 parts of water with an emulsifying agent, combining said kerosene emulsion with an asphalt emulsion containing 50 to 70% solids and adding said metallic paste to said combined emulsions to provide a paint containing from 12 to 18 parts of powdered metal to 15 to 25 parts of the said asphalt emulsion.

5. The process of forming a metallic paint comprising forming a paste of 12 to 18 parts of aluminum powder in kerosene to give a consistency of about 70% solids, forming an emulsion of 15 to 60 parts of kerosene with up to 30 parts of water containing an emulsifying agent, combining with the kerosene-water emulsion a preformed asphalt emulsion in water containing 60 to 70 parts of solids, and adding the aluminum paste to said combined emulsions.

ROBERT R. THURSTON.
RAYMOND J. RUBLE.